Patented Nov. 22, 1938

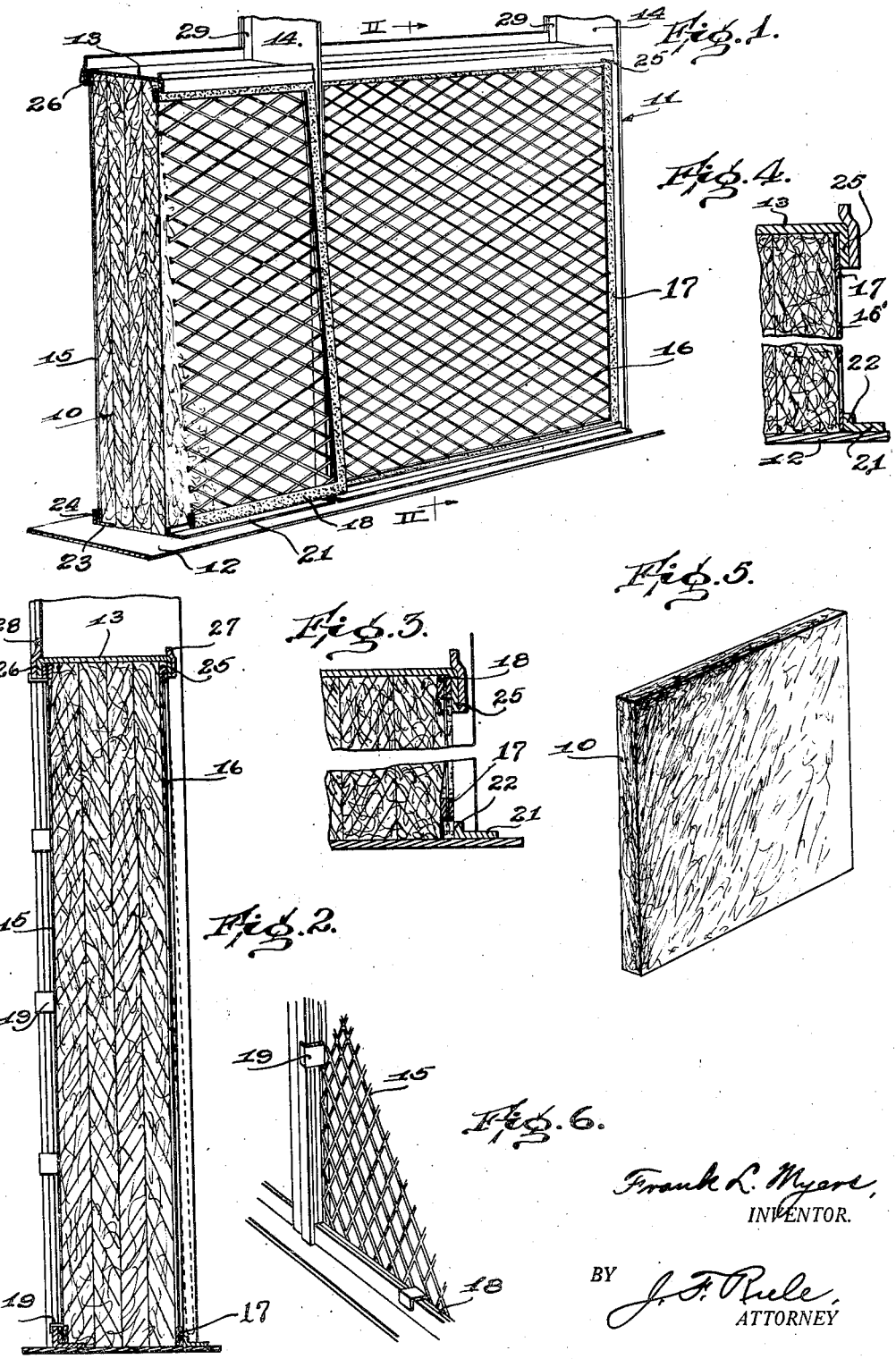

2,137,246

UNITED STATES PATENT OFFICE 2,137,246

FILTER

Frank L. Myers, Newark, Ohio, assignor to Owens-Illinois Glass Company, a corporation of Ohio Application November 27, 1935, Serial No. 51,753

4 Claims. (Cl. 183—49)

My invention relates to filters designed for filtering air and other gases. More particularly it relates to filter units of the "throw-away" type intended to be used until they accumulate dust or dirt to their full normal capacity and then to be discarded and replaced by new filter units.

Filter units of the type designed for single use ordinarily consist of a body of fibrous filtering material in matted form and a container or carton in which said body is contained and by which the filtering material is held in shape while in use. The major surfaces of such containers are made of openwork or grills to permit the free passage of air or gases through the filter. The cartons or envelopes containing the filtering material and forming part of the filter units, are thrown away with the filtering material and add materially to the expense of the filter units.

An object of the present invention is to provide a filter apparatus comprising self-supporting filter units in which the fibrous filter body retains its shape without the use of an envelope or other container, in combination with a supporting framework in which the units are removably installed. The invention thus provides a filter apparatus in which the used filter material can be replaced with great facility and at an extremely low cost.

Other objects of the invention will appear hereinafter.

Referring to the accompanying drawing:

Fig. 1 is a perspective view illustrating a group of filter pads or units and the framework in which they are mounted.

Fig. 2 is a cross-sectional view of the same at the line II—II on Fig. 1.

Fig. 3 is a fragmentary sectional detail showing how the front supporting grill may be placed in position or removed from the frame.

Fig. 4 is a sectional view showing a modified form of removable front grill.

Fig. 5 is a perspective view of a self-supporting sheet or unit of filtering material.

Fig. 6 is a fragmentary perspective view showing a grill and means for attaching it to the framework.

The apparatus comprises filter units 10 removably mounted in a supporting framework 11. The framework may be permanently installed in an opening in a wall of a building or elsewhere.

The filter unit consists of a body of fibrous material, as, for example, fibrous glass, in matted or felted form. A suitable binding material may be used to bond the fibers together and give the requisite strength and rigidity to the filter body as a whole to make it self-supporting so that it retains its shape while being handled. Such material may consist, for example, of vulcanized rubber. The binder may consist of latex applied in the form of a spray or otherwise and then vulcanized. The filter fibers are also coated with a dust-catching material such as a viscous oil or oily substance.

The framework 11 in which the filter units are mounted, comprises horizontal frame members 12 and 13 and vertical frame members 14 spaced to provide rectangular cells of a size corresponding to the filter units 10 and in which the latter are removably supported. Associated with each cell is a rear grill 15 and a front grill 16 by which the filters are supported and held in position within the cells. The front grill 16 comprises a body of openwork material which may consist of expanded metal or may be of other openwork construction permitting the free passage of air and having the requisite strength and rigidity. A border 17 which may be of sheet metal, extends along the margins of the grill and may be soldered or otherwise secured thereto. A strip 18 of felt or other material is folded over the border 17 and may be secured thereto by an adhesive. This felt strip extends along the entire margin of the grill and serves as a sealing gasket to prevent air leakage between the filter and the cell walls within which it is mounted.

The rear grill 15 may be of substantially the same construction as the front grill 16. It also includes a marginal strip or frame covered with felt or the like to provide a sealing gasket. Tabs 19 which may be integral with the border 17, are provided for attaching the grill 15 to the framework 11 and holding it permanently in position.

The cell walls are provided with front and rear flanges which provide an abutment for the grills. The lower front flange is formed by a strip 21 secured to the frame member 12 and having an upturned portion in the form of a flange 22. An angle bar or strip 23 also secured to the frame member 12 has an upturned flange 24 providing an abutment for the grill 15. The upper frame member 13 has its front and rear margins turned downward to form flanges 25 and 26 providing abutments for the upper edges of the front and rear grills. Front and rear sheet metal strips 27 and 28 which overlie and are secured to the flanges 25 and 26, respectively, project upwardly above the upper face of the frame member 13 to provide abutments for the grills in the tier of cells above the frame member 13. The vertical frame members 14 may also be formed with flanges 29 to provide abutments for the vertical edges of the rear grills 15.

As herein shown, a plurality of filter units 10 are mounted in each cell of the framework 11. After the framework has been assembled and the grills 15 secured in position, the filter units 10 are introduced through the open front of the cells. The front grills 16 are then placed in position to complete the assembly. The front grill is placed in position by first inserting the upper edge behind the upper front flange 25 and then raising the grill as indicated in Fig. 3 so that the lower edge thereof clears the lower flange 22, permitting the lower end of the grill to be moved back past the plane of the lower flange, the grill then being moved bodily downward to rest on the frame member 12. It will be noted that the upper flange 25 is substantially wider than the lower flange so that it engages and supports the grill while the latter is in its lowered position. It will thus be seen that the grill can be very easily and quickly placed in position where it is securely held without any auxiliary locking or holding devices. It can also be removed with equal facility by simply lifting it to clear the lower flange 22 and then swinging the lower end outward as indicated by dotted lines in Fig. 2.

When the filter is in use, the force of the air passing therethrough has a tendency to distort or disrupt the filter pads. Any bending or distortion of the filter pad is detrimental and impairs its efficiency. The grills 15 and 16 by providing a firm backing or support for the entire major surface areas of the filter, effectually prevent such distortion and obviate the necessity of the usual supporting devices provided as a part of the filter units.

When the filter has been in use until it has accumulated dust or foreign material to its normal capacity, the filter units can be quickly removed and replaced by new units. As a large percentage of the dust is arrested in the filter pad at the front or intake side of the filter, it is usually not necessary to replace all the filter units. It is often practical to discard the front pad or pads and then place the new pads at the rear or outlet side. The other used pads which are comparatively clean then take the place of the pad or pads which are discarded.

Figure 4 shows a form of grill 16' in which the sealing material 18 is omitted. When the rear grill 15 is provided with a sealing gasket it will ordinarily serve effectively to prevent air leakage so that the gasket on the front grill is unnecessary. On the other hand, the front grill alone may be provided with sealing material, if preferred.

Modifications may be resorted to within the spirit and scope of my invention.

I claim:

1. A filtering apparatus comprising a stationary framework formed to provide a rectangular cell, flanges extending along the cell walls and providing an abutment, a grill mounted in the cell with its marginal surfaces bearing against said abutment, said grill forming the rear wall of the cell, a rigid self-supporting body of filtering material mounted in said cell and bearing against said grill, said body composed of a matted mass of fibers bonded together to form a rigid handleable pad, a front grill, and means for removably holding the front grill in said cell with the grill bearing against the front face of the filter body, said last mentioned means comprising holding strips extending along opposite walls of the cell, one of said strips extending from the cell wall a greater distance than the other, the front grill being of such dimensions that it can be engaged behind said holding strips and can be released from the holding strips by a movement in its own plane, for removal from the cell.

2. A filtering apparatus comprising a stationary framework formed to provide a rectangular cell, flanges extending along the cell walls and providing an abutment, a grill mounted in the cell with its marginal surfaces bearing against said abutment, said grill forming the rear wall of the cell, a rigid, self-supporting body of filtering material mounted in said cell and bearing against said grill, said body composed of a matted mass of fibers bonded together to form a rigid handleable pad, a front grill, and means for removably holding the front grill in said cell with the grill bearing against the front face of the filter body, said last mentioned means comprising a holding strip extending along the upper cell wall and projecting downward therefrom, and a holding strip extending along the lower cell wall and projecting upwardly therefrom, said front grill being of such dimensions that it can be lifted to clear said lower strip and thereby permit the removal of the grill from the cell.

3. A filtering apparatus comprising a stationary supporting framework for a self-supporting filter pad of fibrous material consisting of reticulated fibrous glass and a binder therefor, and a coating of adhesive over the fibers, said framework formed of quadrilaterally arranged plates providing a cell, a grill secured in said cell in position to form a backing for a filter pad mounted in the cell at the discharge side thereof, and means for removably securing said self-supporting filter pad within the cell, said means comprising a second grill, and a flange secured to said framework and projecting inwardly into said cell for removably holding the second grill in position to bear against and form a facing for a filter pad mounted in the cell.

4. A filtering apparatus comprising a stationary supporting framework for a self-supporting filter pad of fibrous material consisting of reticulated fibrous glass, a binder therefor, and a coating over the fibers of material adapted to collect dust particles, said framework formed of quadrilaterally arranged plates providing a cell, a grill secured in said cell in position to form a backing for a filter pad mounted in the cell at the discharge side thereof, a second grill removably securing said self-supporting filter pad within the cell, and a flange secured to said framework and projecting inwardly into said cell and removably holding the second grill in position to bear against and form a facing for a filter pad mounted in the cell.

FRANK L. MYERS.